United States Patent [19]  [11] 4,260,564
Baiocchi et al.  [45] Apr. 7, 1981

[54] PROCESS FOR THE MANUFACTURE OF SPECTACLE LENSES MADE OF DIGLYCOL ALLYL CARBONATE OR THE LIKE

[75] Inventors: Paolo Baiocchi; Gian G. Giani, both of Parma, Italy

[73] Assignee: Intercast Europe S.p.A., Parma, Italy

[21] Appl. No.: 67,060

[22] Filed: Aug. 15, 1979

[30] Foreign Application Priority Data

Feb. 14, 1979 [IT] Italy .................................. 40021 A/79

[51] Int. Cl.$^3$ ............................................. B29D 11/00
[52] U.S. Cl. ...................................... 264/2.2; 264/2.4; 526/314; 526/232.5
[58] Field of Search ........................... 264/1, 2; 351/47

[56] References Cited

U.S. PATENT DOCUMENTS

| 3,211,811 | 10/1965 | Laumau | 264/1 |
| 3,700,761 | 10/1972 | O'Driscoll et al. | 264/1 |
| 4,095,772 | 6/1978 | Weber | 264/1 |

*Primary Examiner*—Donald J. Arnold
*Assistant Examiner*—W. Thompson

*Attorney, Agent, or Firm*—Mason, Fenwick & Lawrence

[57] ABSTRACT

An improved method for manufacturing spectacle lenses and the like from diglycol allyl carbonate or equivalent plastic by first heating the plastic monomer in the liquid state and containing a polymerization initiator therefor in a planar mold until a degree of polymerization in the range of about 65–85% of completion has been achieved, then removing the partially polymerized material from the mold, subjecting the same to deflection to a curvature corresponding to the desired lens and heating the thus-deflected material until polymerization is complete. Preferably, the initial planar molding step is carried out with a layer or sheet of the material of sufficient size as to contain a plurality of individual lens elements, and after removal thereof from the mold, a plurality of individual lens elements is derived therefrom and such elements are separately subjected to deflection and further polymerization. Preferably, the amount of polymerization initiator exceeds the normally used amount. A post thermal treatment is advantageous to stabilize the lens elements from loss of the curvature imparted thereto.

10 Claims, No Drawings

PROCESS FOR THE MANUFACTURE OF SPECTACLE LENSES MADE OF DIGLYCOL ALLYL CARBONATE OR THE LIKE

FIELD OF INVENTION

This invention relates to a process for the manufacture of glow screens for the eyes, particularly spectacle lenses, made of diglycol allyl carbonate or the like.

Hereinafter reference is made especially to diglycol allyl carbonate and also the following description will refer almost exclusively to this substance, due to its convenience for descriptive purposes, but it is understood that this invention is extended also to those substances which exhibit similar chemical and physical properties and present the subsequently mentioned undesirable defects, in short to equivalent substances. Diglycol allyl carbonate (commerically known as CR-39) is a monomer having the following formula:

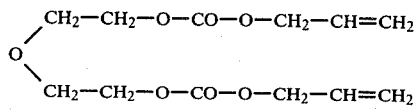

it is a relatively stable liquid at room temperature which, by means of particular thermal cycles and the addition of polymerization initiators, polymerizes into a transparent material endowed with excellent qualities both from the mechanical and the optical points of view. Thanks to the aforementioned properties, CR-39 is a material which is extremely suitable, and widely adopted, for the manufacture of glow screens for the eyes and especially of spectacle lenses.

Lenses manufactured with this type of material exhibit optical and mechanical (superficial hardness) characteristics very similar to lenses made in glass; they are furthermore endowed with extreme lightness, the possibility of being processed in shims, the possibility of being coloured and shaded in various manners, and moreover exhibit excellent shock-resistance.

DESCRIPTION OF PRIOR ART

A known process for the manufacture of CR-39 lenses involves injecting CR-39 in its liquid state, with the addition of suitable polymerization initiators, into curved molds (usually in the shape of spheric caps) of the same size as the lens which is to be obtained; inside said molds, each of which is designed to produce only one lens at a time, the polymerization occurs, which is also favored by special thermal cycle treatments. The abovementioned process makes it possible to obtain concavoconvex lenses endowed with excellent optical qualities; such lenses, however, present the drawback of high manufacturing costs since, as pointed out previously, they must be manufactured one by one.

Another process for the manufacture of lenses of this type is known wherein CR-39 is polymerized, always with the addition of suitable polymerization initiators and the adoption of special thermal cycle treatments, in a planar mold (usually rectangular or square-shaped) the size of which is considerably greater that of the lenses which are to be produced.

The plane sheet thus obtained is cut into a number of plates, normally rectangular in shape, the dimensions of which are equal to those of the lenses to be manufactured.

These plates are then subjected to hot deformation in order to give them the desired curvature; hence they are processed mechanically in order to endow them with a suitable profile for fitting onto the spectacle frame.

By means of the latter process one obtains lenses which posses optical characteristics which, though included within the tolerances established by international rules and regulations, are slightly inferior to those obtained by means of the curved mold polymerization process (obviously due to the deformation to which the lenses are subjected during manufacture); such lenses, however, are distinctly cheaper to manufacture than curved mold lenses.

Nevertheless lenses obtained by deforming flat plates present a significant defect: if exposed to a heat source which causes their temperature to rise above 50°–60° C., a temperature which may be reached quite easily, e.g. leaving a pair of glasses equipped with such lenses in a car exposed to sun rays, said lenses tend to lose their original curvature and to return to their plane state.

The above defect, which we have been aware of for quite some time, has imposed a limitation upon the employment of glasses obtained with this process, especially relative to glasses whose frame is not equipped with a strong rim for the lenses, so as to oppose the aforementioned phenomenon. One has sought to avoid this defect by copolymerizing CR-39 with other monomers or additives of various kinds capable of eliminating this the deflection loss of the lenses when subjected to heat.

These additives, though, besides deteriorating the characteristics of pure CR-39 to a considerable degree, especially as far as abrasion resistance is concerned, do not achieve the desired result because they cannot eliminate the above-mentioned memory defect, but they can only determine its occurrence at slightly higher temperatures than those at which said defect occurs when the lenses are made of pure CR-39.

OBJECTS OF THE INVENTION

An object of this invention is to eliminate the drawbacks described above by providing a process for the manufacture of glow screens for the eyes and in particular of spectacle lenses made in CR-39 which makes it possible to obtain screens and lenses (by means of flat plate deformations), whose curvature, once stabilized, is not altered by subsequent exposure to heat.

A further object of this invention is to provide a process for the manufacture of screens or lenses in CR-39 which is considerably more economical compared to polymerization in a curved mold and which, at the same time, allows one to manufacture screens or lenses having excellent characteristics from the mechanical point of view, such as for instance resistance to abrasion and to shock, as well as from the optical point of view.

GENERAL SUMMARY OF THE INVENTION

The above and other objects are achieved by an improved method for manufacturing spectacle lenses and the like from diglycol allyl carbonate or equivalent plastic by first heating the plastic monomer in the liquid state and containing a polymerization initiator therefor in a planar mold until a degree of polymerization in the range of about 65-85% of completion has been achieved, then removing the partially polymerized material from the mold, subjecting the same to deflection to a curvature corresponding to the desired lens and heating the thus-deflected material until polymerization is complete. Preferably, the initial planar molding step is carried out with a layer or sheet of the material of sufficient size as to contain a plurality of individual lens elements, and after removal thereof from the mold, a plurality of individual lens elements is derived therefrom and such elements are separately subjected to deflection and further polymerization. Preferably, the amount of polymerization initiator exceeds the normally used amount. A post thermal treatment is advantageous to stabilize the lens elements from loss of the curvature imparted thereto.

DETAILED DESCRIPTION

Some further features and advantages furnished by the present process will appear more clearly in the course of the detailed description of a practical embodiment of the process under discussion, which is described by way of example and is in no way limiting upon the invention.

CR-39 at its liquid state is mixed with a polymerization initiator; for example, the polymerization initiator is dicycloesil carbonate peroxide whose structural formula is:

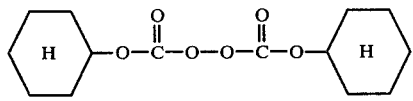

the percentage of polymerization initiator present in the mixture is 7%. The liquid mixture thus obtained is injected into a plane mold composed of two glass sheets facing each other. The edges of said mold are equipped with suitable gaskets in order to avoid leakage of the liquid.

The mold containing the liquid mixture is successively subjected to a first thermal treatment which entails the heating of the material from a temperature of 40° C. to about 70° C.; such heating process is carried out, considering that the increase in temperature follows approximately an exponential trend, within three hours.

This first thermal treatment is carried out by plunging the mold containing the mixture into a tank containing water at varying temperatures; the function of the water is exclusively that of a heat-exchange fluid.

During this first thermal treatment the mixture begins the process of polymerization.

This first thermal treatment is continued until the mixture has reached a degree of polymerization between 65% and 85% of the initial mass, in particular polymerization is about 75%.

Then the mold is removed from the tank and opened; the sheet formed by the mixture which has reached the desired degree of polymerization, and which at this stage is solid enough to handle but sufficiently soft, is withdrawn from the mold and cut into several lens-size plates or elements of a substantially rectangular shape.

Each of such plates which, as pointed out previously are quite soft, is made to rest on a support endowed with a spherical concavity; by creating a void between said plate and the relative spherical concavity, each plate is forced to acquire a lie in accordance with the spheric concavity of the relative support. The plate-containing supports are then introduced into an air furnace and subjected to a second thermal treatment which consists of their remaining within said furnace, at a temperature of 85° C.-90° C., for about one hour.

During the above second thermal treatment and while deflected into the desired spherical curvature, the mixture completes its polymerization.

At the end of the second thermal treatment the plates have taken the spheric cap shape of the hollows of said supports and exhibit all the aforementioned mechanical and optical characteristics.

Furthermore, the spheric cap-shaped plates obtained with the described possess the property of maintaining their curvature even if subjected to subsequent heating treatments, something which was impossible to achieve with the prior art manufacturing processes employing flat plates.

In order to avoid some slight settling of the plate curvature provision is made for a third curvature stabilizing thermal treatment which consists of keeping said plates deflected at a temperature of about 100° C. for about ten minutes.

Through the above third thermal treatment one eliminates any possible deformation due to heating of the plates.

The process described above by way of example may undergo variations in respect of the percentage and of the type of polymerization initiator, as well as of the temperatures and time spans pointed out, since the values of such quantities, dependent upon one another, may be combined differently though allowing the achievement of the same results.

For instance, a diminuition in the percentage of polymerization initiator entails an increase in time and/or temperature of the aforementioned thermal treatments.

A very important feature of the process described is the interruption of the polymerization process of the mixture composing said flat plate and, in particular, by the degree of polymerization reached by the mixture at the time of said interruption.

The interruption of the polymerization process must necessarily take place when the mixture has reached a degree of polymerization between a minimum of 65% and a maximum of 85% of the initial mass. In our case the gauging of the degree of polymerization is carried out by comparing the more reduced absorption of ultraviolet rays exhibited by a test piece in which polymerization has not been brought to completion, with the absorption of a completely polymerized test piece.

In particular, polymerization is interrupted when the test piece crossed by an ultra-violet light ray with a wave length of $260.10^{-9}$ meters (260 nanometers) exhibits an absorption included between the values of 0.5 and 0.7.

Said absorption is measured with a spectrophotometer which supplies directly the values of these quantities.

By way of comparison, the same test piece, in which on the other hand polymerization has been completed, exhibits an absorption above 1.5.

This test has been carried out with a test piece with thickness 1.7 millimeters. Other methods, such as the densitometric method, may be adopted in order to determine the degree of polymerization of the mixture which constitutes the test piece.

If polymerization is interrupted before reaching the minimum level of polymerization it is no longer possible, at a later stage, to handle and process the sheet because it is still at a gelatinous state; if, on the other hand, the interruption is executed after the achievement of maximum polymerization one cannot obtain the stability of the lens curvature achieved by means of the subsequent deformation of the flat plates. Moreover, it is interesting to note that the mixture prepared for the purpose illustrated above contains a percentage of polymerization initiator which is higher than the normal values because one has found that in the stage of completion of polymerization, a part of the initiator which is still available is used up without producing bonds.

For instance, with the temperature and time values of the process described above we used a percentage of polymerization initiator of 7% while the value recommended by the firm producing CR-39 is about 4.5%.

As pointed out previously it is possible to execute the coloring of lenses obtained with CR-39; said coloring may take place equally either before or after the complete polymerization of the mixture.

Various practical or applicational alterations may be introduced to the invention without going beyond the boundaries of the inventive idea as claimed hereunder.

We claim:

1. In a process for manufacturing plastic spectacle lenses by the polymerization in a mold of diglycol allyl carbonate or the like plastic monomer admixed with a polymerization initiator therefor, in combination, the improvement comprising the steps of:
   (1) carrying out said polymerization with heating in a mold having planar surfaces until a degree of polymerization in the range of about 65-85% of completion has been achieved; and
   (2) removing the partially polymerized material from said mold, subjecting the same to deflection to a curvature corresponding to the desired lens and heating the thus-deflected material to complete the polymerization thereof.

2. The method as in claim 1 wherein the material initially polymerized in said planar mold is in the form of a layer of sufficient size to contain a plurality of individual lens elements and after removal thereof from said mold a plurality of individual lens elements is derived therefrom and said elements are separately subjected to such deflection and further polymerization.

3. The method of claim 1 wherein an excess of said polymerization initiator is present.

4. A process according to claim 1 wherein after completion of said polymerization, said element is heated to stabilize the curved shape thereof.

5. A process according to claim 4 wherein said element is heated to a temperature of about 100° C. for about 10 minutes to stabilize the same.

6. The process of claim 1 wherein said polymerization initiator is dicycloesil-carbonate peroxide and is present in the amount of about 7%.

7. The process of claim 1 wherein during said initial planar molding step, the monomer-initiator mixture is heated from about 40-70° C. within a period of about 6 hours and the temperature increasing approximately exponentially within this range over this period.

8. The process of claim 1 wherein the partially polymerized material while being deflected is heated at a temperature between about 85-90° C. for about 1 hour.

9. The process of claim 1 wherein the individual lens elements are each deflected by placing the same upon a support provided with a spheric concavity and forcing the element into contact with the surface of such concavity.

10. The process of claim 1 wherein heat is applied to the planar mold during said initial molding step by immersing the mold into a heated heat exchange liquid and heat is applied to the individual lens elements while being deflected to the desired curvature by surrounding the same with heated air.

* * * * *